(12) United States Patent
Dragonetti

(10) Patent No.: US 7,039,122 B2
(45) Date of Patent: May 2, 2006

(54) METHOD AND APPARATUS FOR GENERATING A COMPOSITE SIGNAL

(75) Inventor: Philip George Dragonetti, Largo, FL (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 742 days.

(21) Appl. No.: 09/978,186

(22) Filed: Oct. 17, 2001

(65) Prior Publication Data

US 2003/0072385 A1    Apr. 17, 2003

(51) Int. Cl.
  *H04L 27/04* (2006.01)
  *H04L 27/12* (2006.01)
  *H04L 27/20* (2006.01)

(52) U.S. Cl. .................. 375/295; 327/291; 341/20; 341/173

(58) Field of Classification Search ............ 375/132, 375/295, 296, 298, 376; 370/535
See application file for complete search history.

(56) References Cited

U.S. PATENT DOCUMENTS 6,335,951 B1    1/2002 Cangiani et al.
2002/0075907 A1*  6/2002 Cangiani et al. ........... 370/535

OTHER PUBLICATIONS

Park, K., "Quadrature-Multiplex Modulation, System with Application to the Orbiter's Ku-band Link," National Telecommunications Conference, Dec. 1, 1975, pp. 33-22-33-26, XP008039410, New York, United States.

* cited by examiner

*Primary Examiner*—Stephen Chin
*Assistant Examiner*—Erin M. File
(74) *Attorney, Agent, or Firm*—Edell, Shapiro & Finnan, LLC

(57) ABSTRACT

A programmable waveform generator forms a composite transmission signal containing multiple information signals using a reduced number of hardware components to modulate the phase and amplitude of the carrier signal. A signal generator develops baseband direct sequence spread spectrum digital bit streams from corresponding input data signals. The values of the digital bit steams are used to simultaneously control states of phase modulators and variable attenuators which modulate the phase and amplitude of the in-phase and quadrature carrier components. The programmable waveform generator can be used to implement an interplex modulator producing a constant-envelope composite signal with fewer phase modulators and attenuators.

64 Claims, 4 Drawing Sheets

METHOD AND APPARATUS FOR GENERATING A COMPOSITE SIGNAL

BACKGROUND OF THE INVENTION

1. Field of the Invention

The present invention relates to a method and apparatus for generating a composite signal and, more particularly, to a programmable waveform generator operable as an interplex modulator to produce composite, constant-envelope signals.

2. Description of the Related Art

Combining multiple signals on the same radio frequency (RF) carrier is often desirable in both one-way and two-way communications systems, and the importance of signal combining techniques will grow as RF communications systems continue to proliferate and RF spectrum becomes increasingly crowded. Existing methods of signal combining include techniques that generate composite signals whose instantaneous power varies with time (non-constant-envelope signals), such as linear signal combination. Other existing techniques, such as conventional phase shift keyed/phase modulated (PSK/PM) systems, generate constant-envelope composite signals.

Linear methods that generate non-constant-envelope composite signals result in power-inefficient mechanizations, because the power amplifiers that are used for transmission of the composite signals must operate in the linear region. Power amplifiers are much more efficient when operated in the saturated mode. Therefore, constant-envelope signal structures are required if full-power, undistorted transmission is sought.

For example, in a CDMA cellular telephone system, linear superposition of chip-synchronous, orthogonal signals to be transmitted from a base station is a theoretically lossless multiplex if the subsequent transmission chain remains linear. Maintaining linearity requires a linear high power amplifier (HPA). Since any HPA characteristic eventually saturates as its input power increases, such base station transceiver linear amplifiers are typically run at 4–5 dB average power backoff to accommodate peak power needs. In addition, the rather severe spectral containment filtering applied to each user signal before multiplexing creates amplitude fluctuations of 4–5 dB peak-to-average power, requiring additional backoff. Consequently, total backoff can easily be 9 or 10 dB in this particular context.

Thus, linear combination techniques are maximally efficient in the sense that there is no actual signal power loss, but the overall efficiency of such techniques is compromised by the need to operate the amplifier at a significant power back-off to accommodate the instantaneous signal envelope fluctuations. Further, conventional PSK/PM systems have limited power efficiency, because PSK/PM systems include unmodulated carrier and cross modulation terms, which represent wasted power.

An alternative approach to producing greater average power is to achieve a more effective allocation of the loss budget between the multiplexer and the power amplifier. Applied to orthogonal waveforms, non-linear multiplex methods that produce a composite constant-envelope signal permit a greater fraction of the available transmitter power to be used for communication, but at the expense of a multiplexing loss that may be characterized as either crosstalk (induced non-orthogonality or harmonic distortion) or receiver cross-correlation mismatch. This multiplexing loss, however, is typically smaller than the power backoff it replaces, resulting in a favorable trade.

The Global Positioning System (GPS) is another application in which constant-envelope signals would be beneficial. This system includes a constellation of Earth-orbiting satellites that transmit signals useful for determining position. By measuring the time delay in broadcasted signals received from several of these satellites, a receiver can determine its own position using trilateration. Continually evolving GPS system requirements necessitate the simultaneous transmission of multiple signals from each of the GPS satellites, making constant-envelope signals of great interest in developing future GPS signal structures and system architectures.

As military and civilian requirements for GPS change over time, operational modifications will continue to be necessary. Critical signaling parameters, such as chip rates, code types, fixed carrier offset, hopping sequences for hopped carrier offset, and relative power ratios, may require modification throughout the operational life of a satellite. Thus, in addition to having the capability to produce constant-envelope signals, the waveform generator onboard each GPS satellite must be remotely reprogrammable to support generation of a variety of possible future signaling waveforms.

Interplex Modulation is one technique gaining consideration for generating constant-envelope, phase modulated composite signals that offers improved efficiency over standard PSK/PM systems. The interplex modulation technique is described by Siegel et al. in "Communication Satellite Integrity and Navigation Payload on DSCS", Annual Meeting of the Institute of Navigation, Cambridge, Mass. June 1993, the disclosure of which is incorporated herein by reference in its entirety. Using interplex modulation, three or more signals can be combined to generate a constant-envelope composite signal with minimal combining losses. Again, a constant-envelope composite signal is highly desirable so that a highly-efficient saturated power amplifier can be used.

FIG. 1 is a schematic representation illustrating a typical interplex modulator for combining three signals. Input signals $S_1$, $S_2$ and $S_3$ are digital bitstreams of logical ones and zeros. In FIG. 1, the input signals are shown in "analog" representation, meaning the signals assume the values of –1 and +1, corresponding to the logic values 1 and 0, respectively. Analog multipliers 10 and 12 perform analog multiplications of $S_1$ times $S_2$ and $S_1$ times $S_3$, respectively. Analog gain element 14 places a gain of $\beta_1$ on the product $S_1S_2$, analog gain element 16 places a gain of $\pi/2$ on $S_1$, and analog gain element 18 places a gain of $\beta_2$ on the product $S_1S_3$. An analog summer 20 sums the outputs of the analog gain elements and supplies the sum to a linear phase modulator 22. Linear phase modulator 22 also receives a $\mathrm{Sin}(\omega t)$ carrier signal and modulates the sum signal with the carrier signal to produce the composite constant-envelope output signal v(t) for transmission. The phase modulator has a gain of 1 radian per unit input; therefore, the output from the phase modulator from a unit input has a one radian phase deviation of the $\mathrm{Sin}(\omega t)$ carrier. Accordingly, the output of the phase modulator is:

$$v(t)=\mathrm{Sin}(\omega t+S_1S_2\beta_1+S_1\pi/2+S_1S_3\beta_2) \quad (1)$$

From interplex modulation theory, it is known that the output transmission signal v(t) given by equation (1) can be equivalently expressed as:

$$v(t)=S_1\mathrm{Cos}(\beta_1)\mathrm{Cos}(\beta_2)\mathrm{Sin}(\omega t)+S_2\mathrm{Sin}(\beta_1)\mathrm{Cos}(\beta_2)\mathrm{Cos}(\omega t)+S_3\mathrm{Cos}(\beta_1)\mathrm{Sin}(\beta_2)\mathrm{Cos}(\omega t)-S_1S_2S_3\mathrm{Sin}(\beta_1)\mathrm{Sin}(\beta_2)\mathrm{Sin}(\omega t) \quad (2)$$

where $0 \leq \beta_1 \leq \pi/2$ radians and $0 \leq \beta_2 \leq \pi/2$ radians and therefore $\mathrm{Sin}(\beta_1)$, $\mathrm{Sin}(\beta_2)$, $\mathrm{Cos}(\beta_1)$, and $\mathrm{Cos}(\beta_2) \geq 0$, such that the computed signal attenuations are never negative.

The resulting modulator output signal v(t) has a constant envelope; thus, a saturated amplifier can be used to transmit this signal without backoff. The first three terms in equation (2) correspond to the desired signal terms $S_1$, $S_2$ and $S_3$, respectively. The fourth term is an intermodulation (IM) product, which is an undesired term generated by the modulator. Although the IM product consumes some of the available power, the IM product serves to keep the amplitude of the composite signal envelope constant, which in turn facilitates use of saturated amplifiers.

The conventional interplex modulation scheme shown in FIG. 1 suffers from a variety of limitations. The architecture of conventional waveform generators dictates generating the entire composite signaling waveform as a baseband signal and then up-converting the composite baseband signal to the broadcast radio frequency. While this architecture can be used in certain communication systems, such an approach is not suitable for microwave systems, such as GPS, because the baseband frequency is too low to preclude harmonic and intermodulation interference with the desired microwave output. Moreover, timejitter in required digital-to-analog converters adds phase noise onto the desired output signal. Further, in the up-conversion process, the bandpass filters required for each mixing stage produce ringing at phase transitions that generate amplitude envelope variations, which interfere with the efficiency of the saturated high-power amplifiers required for low-power consumption. A result of this non-constant-envelope is signal distortion that adversely impact Bit Error Rate in CDMA systems and navigation accuracy in GPS applications.

A programmable waveform generator suitable for generating constant-envelope composite signals for a GPS system via interplex modulation techniques is described in U.S. patent application Ser. No. 09/205,510 entitled "Programmable Waveform Generator for a Global Positioning System", filed Dec. 4, 1998, the disclosure of which is incorporated herein by reference in its entirety. As described therein, the waveform generator individually generates the three signal components and the intermodulation product as binary signals. The four binary signals are then sent to the modulators and used to directly modulate the RF carrier. Specifically, the four signals are respectively fed to four separate BPSK modulators which modulate either the in-phase or quadrature phase component of the RF carrier. The outputs of the modulators are scaled using variable attenuators to achieve the desired relative power ratios among the four signal components. The final RF output signal is formed by summing the outputs of the four variable attenuators.

The approach taken in the system of the aforementioned patent application eliminates a number of limitations of conventional interplex modulators in generating a constant-envelope composite signal. In particular, the modulating signal has a much lower frequency content than the modulated intermediate frequency signal in a conventional interplex modulator, thereby avoiding harmonic interference in the resultant composite signal. The modulating signals from the waveform generator are clocked binary signals that are sent directly to the modulators, thereby eliminating the D/A converter and any associated jitter and phase noise. Further, because no up-conversion of the modulated signal is required, no amplitude variation is introduced by bandpass filters.

However, the particular interplex modulator implementations described in the aforementioned patent application require a significant number of hardware components. These components contribute significantly to the overall cost, weight, size and complexity of the system, all of which are of concern in space satellite and commercial CDMA applications such as wireless telephony. Thus, previous methods of imparting amplitude and phase modulation on an RF carrier are seriously limited by low data rates, low achievable RF frequencies or complex hardware implementations. Accordingly, there remains a need for an affordable, flexible waveform generator capable of generating constant-envelope signals with a minimum of hardware components, which can be remotely reprogrammed in the field to support changing operational requirements.

SUMMARY OF THE INVENTION

Therefore, in light of the above, and for other reasons that become apparent when the invention is fully described, an object of the present invention is to simplify the hardware implementation of a programmable waveform generator, thereby to improve reliability and power efficiency, to reduce cost, weight, size and complexity, and to make the programmable waveform generator easier to adjust during manufacture and in field operation.

A further object of the invention is to efficiently generate a constant-envelope signal to allow use of saturated high power amplifiers in signal transmission.

Yet a further object of the present invention is to apply high data rate amplitude and phase modulation to an ultra high frequency or microwave CW carrier without introducing excessive amplitude or phase distortion, thereby making interplex modulation feasible at RF frequencies.

Yet a further object of the present invention is to provide a programmable waveform generator that is remotely reprogrammable in the field to adjust for changing system requirements and operational parameters.

A still further object of the present invention is to provide a programmable waveform generator useful in satellite communication and navigation systems, mobile communication systems, including wireless telephony, systems employing spread spectrum signals, CDMA schemes or systems in which constant-envelope composite signals are desired.

The aforesaid objects are achieved individually and in combination, and it is not intended that the present invention be construed as requiring two or more of the objects to be combined unless expressly required by the claims attached hereto.

In accordance with the present invention, a programmable waveform generator requiring fewer components to modulate multiple information signals onto an RF carrier can be realized. An underlying principle of the invention involves the recognition that modulation schemes for transmitting composite signals, such as interplex modulation, can be implemented more efficiently by judiciously mapping the values of the information signals to control of phase modulators and amplitude attenuators responsible for effecting modulation of the RF carrier.

In the case of interplex modulation, determining this mapping involves manipulating the interplex modulation equation given in equation (2) to identify two expressions that respectively represent the complete state of the in-phase component and the complete state of the quadrature component of the composite signal as a function of the input digital bit streams to be transmitted. In each of these expressions, it can be seen that the modulated carrier component can be in only one of four states at any given time.

For each carrier component, these four states can be realized by modulating the phase of the carrier between two possible phase states via a binary phase shift keyed (BPSK) modulator and by simultaneously modulating the amplitude of the carrier component between two possible amplitude states via a variable attenuator based upon the instantaneous values of the digital bit streams. Essentially, while the basic interplex modulation equation suggests four modulation "legs" (two each for the in-phase and quadrature components), the invention permits implementation of an interplex modulator with only two modulation legs (one each for the in-phase and quadrature components), with only a single phase modulator and a single amplitude modulator (i.e., variable attenuator) in each leg.

Advantageously, in contrast to the interplex modulation technique described in the aforementioned patent application, the interplex modulator of the present invention requires less than one-half the modulation hardware, is lighter in weight, smaller, easier to adjust in manufacture, more power efficient and reliable, and costs significantly less. These advantages are particularly advantageous in applications such as space satellites and cellular telephones. Such interplex modulation has commercial application in, for example, GPS signal transmission and in CDMA transmission, as used in wireless telephony.

While the exemplary embodiment described herein involves an amplitude/phase constellation relating to a particular interplex modulation scheme, the signal modulation technique of the present invention allows instantaneous and simultaneous programmability of amplitude and phase of any modulated carrier point in an amplitude/phase constellation (i.e., the set of desired amplitude and phase points of the modulated carrier) and can be extended to nay of a variety of phase and amplitude modulation schemes.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
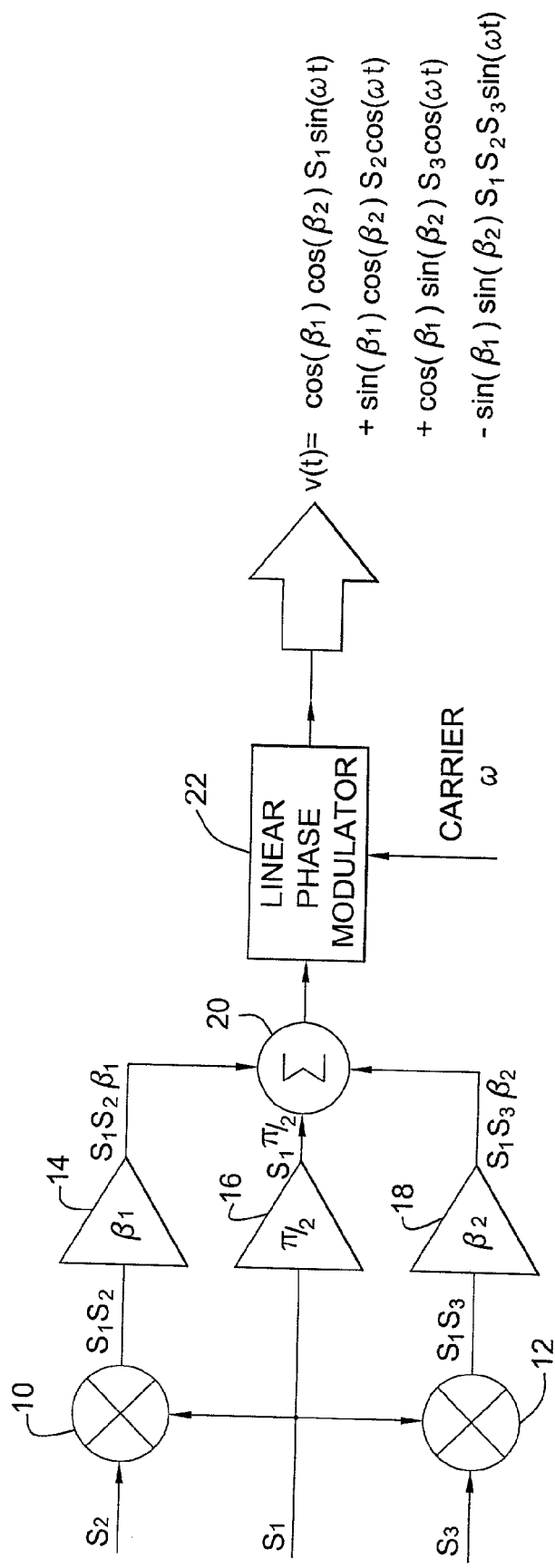
FIG. 1 is a diagrammatic illustration of a conventional approach to interplex modulation.
Figure 2:
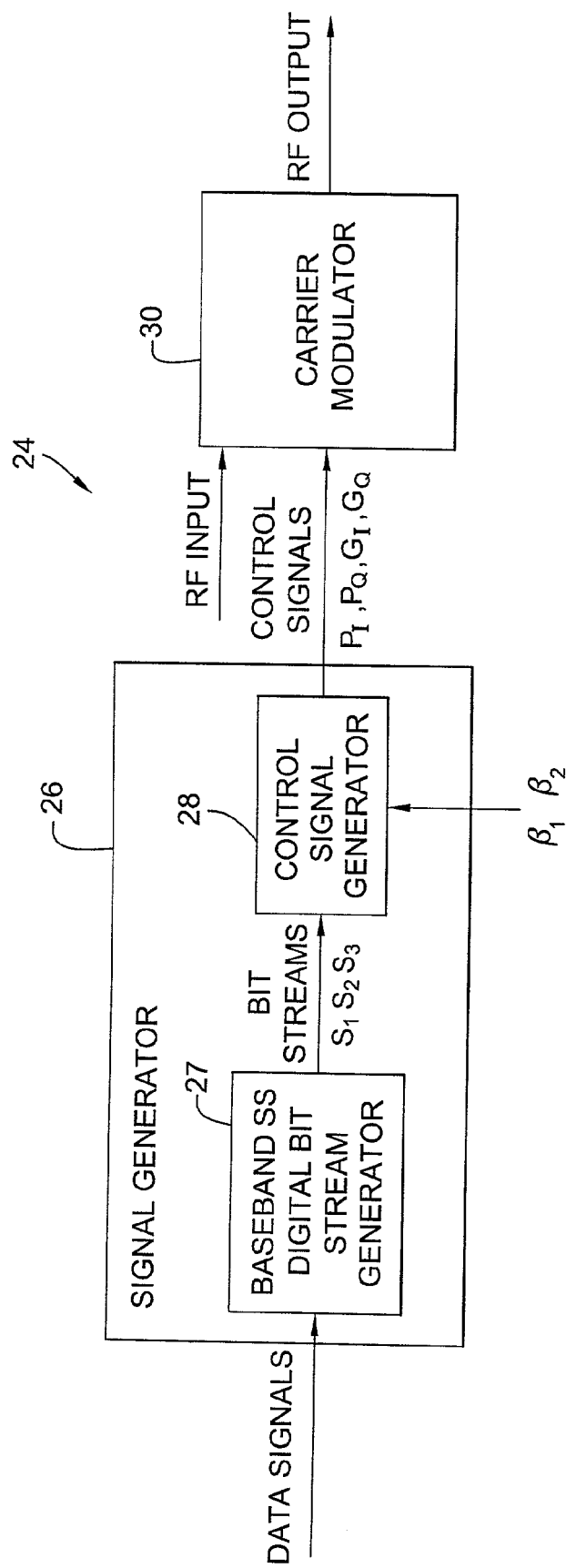
FIG. 2 is a function block diagram of a programmable waveform generator operable as an interplex modulator for producing composite, constant-envelope signals in accordance with an exemplary embodiment of the present invention.
Figure 3:
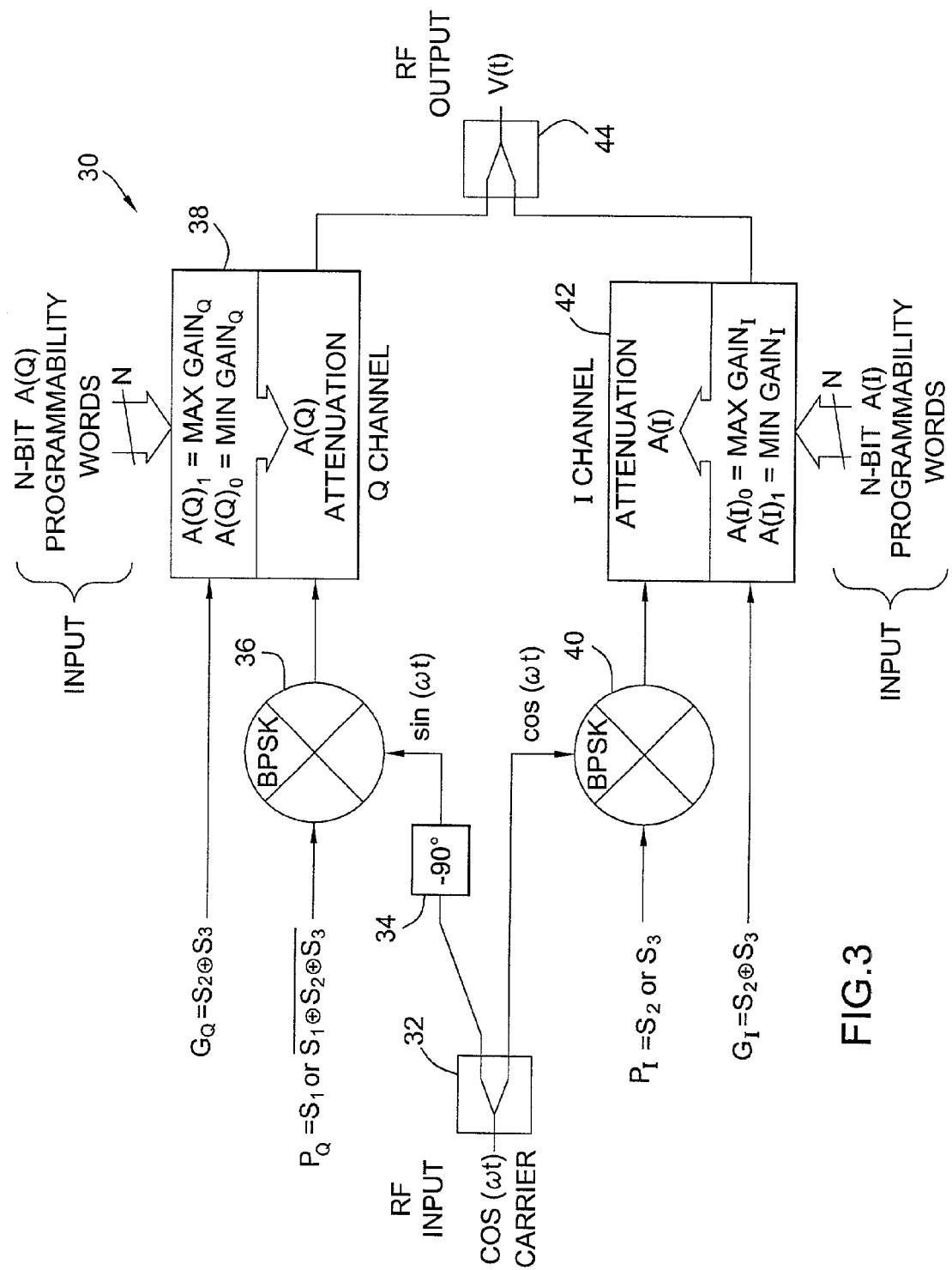
FIG. 3 is a schematic illustration of a carrier modulator in accordance with the exemplary embodiment of the present invention.
Figure 4:
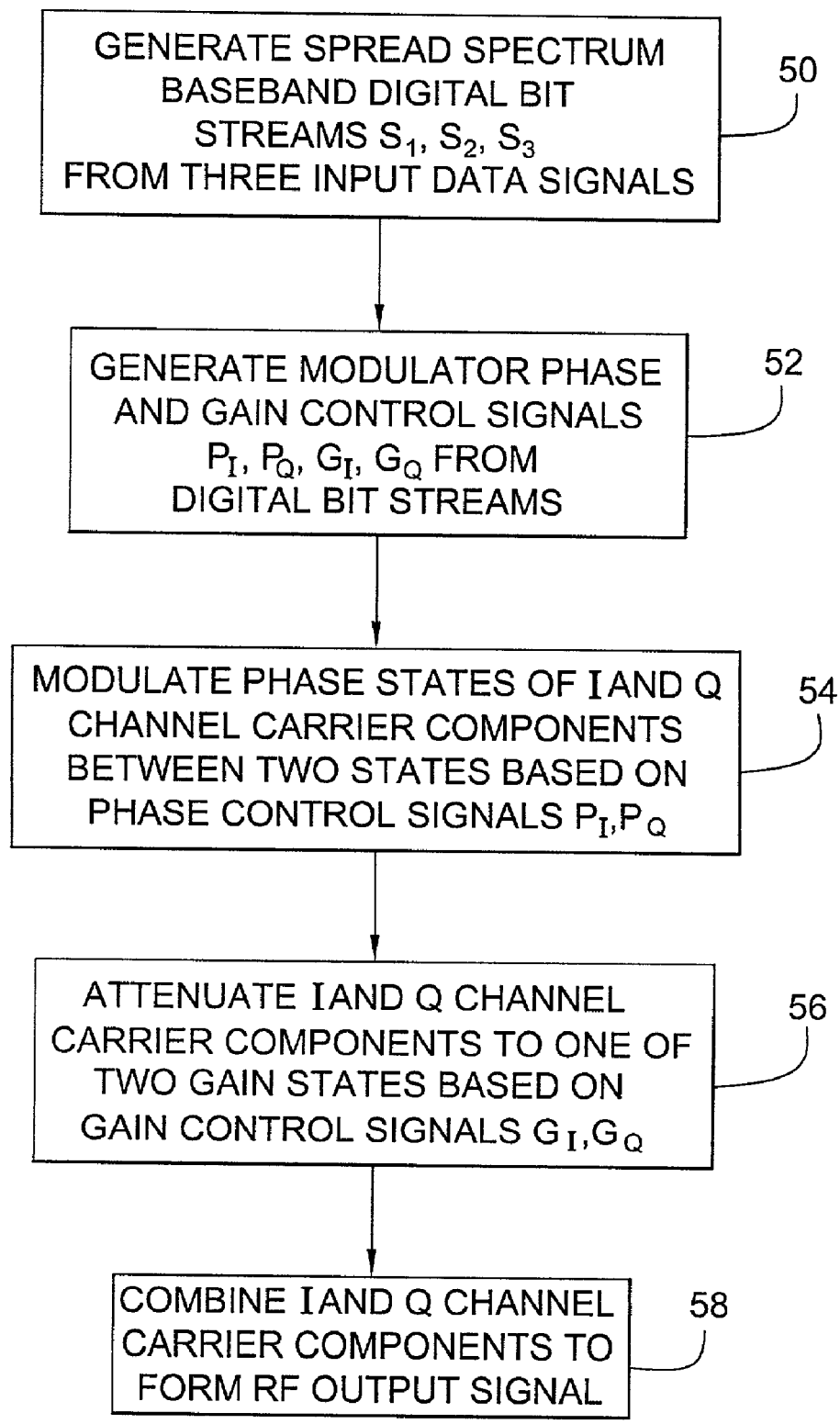
FIG. 4 is a functional flow diagram illustrating the operations performed by the programmable waveform generator to produce a composite, constant-envelope signal in accordance with the exemplary embodiment of the present invention.

The following detailed explanations of FIGS. 2–4 and of the preferred embodiments reveal the methods and apparatus of the present invention. In accordance with a non-limiting exemplary embodiment, the waveform generator of the present invention can be employed in a CDMA communication system transmitting multiple CDMA signals to a single location or to group of spatially dispersed users. These signals employ binary phase-shift keying (BPSK) or quadrature phase-shift keying (QPSK), direct sequence (DS) spread spectrum modulation and have a common chip rate and carrier frequency. The timing of the transmissions being under control of the transmitter, the multiple CDMA signals are chip-synchronous. For purposes of illustration, in the exemplary embodiment, three chip-synchronous DS spread-spectrum signals, $S_1$, $S_2$, and $S_3$, are simultaneously transmitted via a constant-envelope composite signal formed using an interplex modulation scheme. However, the present invention is not limited to formation of a composite signal from three information signals, and the techniques of the present invention may be used to form constant-envelope composite signals from greater numbers of signals.

An exemplary embodiment of the programmable waveform generator of the present invention is shown in FIGS. 2 and 3, and operation of the programmable waveform generator is described in connection with the flow diagram shown in FIG. 4. Referring to FIG. 2, the exemplary programmable waveform generator 24 configured to operate as an interplex modulator includes a signal generator 26 and a carrier modulator 30. Signal generator 26 receives three information-containing data signals to be transmitted and produces corresponding signals appropriate to modulate an RF carrier signal. Specifically, signal generator 26 includes a digital bit stream generator 27 which generates the three baseband DS spread spectrum digital bit streams $S_1$, $S_2$, and $S_3$ corresponding to the three data signals (step 50 in FIG. 4). Digital bit stream generator is preferably programmable and more preferably remotely reprogrammable to facilitate adjusting signaling parameters to support varying system configurations and operational requirements that change throughout the lifetime of the equipment. Such parameters may include or relate to a variety of factors, including, but not limited to: the data rate, the number of signals being transmitted, the signal bandwidth, the encryption scheme being employed, the spread spectrum scheme being employed, the signal modulation, the forward error correction scheme, the multiplexing scheme, the nature of the transmission signal being generated, the transmission frequency and the transmission power. The ability to remotely reprogram signal parameters is particularly advantageous where the transmission system cannot be directly accessed for reconfiguration, such as with satellites or where the device is in the possession of a subscriber or user.

For reasons of power control, a power weighting, or fraction of the available transmit power, is periodically assigned to each CDMA signal. That is, the system may frequently assess the channel conditions, such as interference, multipath and range, between the transmitter and each receiving user in order to adjust the transmit power required to transmit signals to each user. This power distribution assignment remains in effect for a period of time equal to a large number of spread spectrum chips. In the case of three signals being transmitted in a constant-envelope interplex modulation signal, the relative power of the signals is controlled by adjusting the gain factors $\beta_1$ and $\beta_2$ in equations (1) and (2) shown above.

During each interval of constant power distribution, the interplex modulator receives as input a sequence of chips to be transmitted for each of the three signal codes $S_1$, $S_2$ and $S_3$. These chips are represented as binary digital data to be applied to the in-phase (I) and quadrature (Q) transmission channels of the RF signal to be transmitted. The values of data signals $S_1$, $S_2$, and $S_3$ fluctuate at the chip rate. The chip rates are the rate of the digital codes, used for example in the GPS system and in CDMA cellular phone systems, and can be as high as 10 Mbps and higher. Accordingly, based on the commanded power distribution, the interplex modulator must apply the appropriate modulation on the in-phase and quadrature components of the RF signal on a chip-by-chip basis. The interplex modulator ensures that the total instantaneous power, represented by $I^2+Q^2$, remains constant for all chip intervals. The interplex modulator may do so by keeping the sum $I^2+Q^2$ constant, such that the baseband DS spread spectrum signal produced has a constant envelope.

The waveform generator in the aforementioned patent application essentially implements an interplex modulator in accordance with the four mathematical terms that comprise equation (2), reproduced here for convenience.

$$v(t)=S_1 \cos(\beta_1)\cos(\beta_2)\sin(\omega t)+S_2 \sin(\beta_1)\cos(\beta_2)\cos(\omega t)+S_3 \cos(\beta_1)\sin(\beta_2)\cos(\omega t)- S_1 S_2 S_3 \sin(\beta_1)\sin(\beta_2)\sin(\omega t) \quad (2)$$

Specifically, the three signal components $S_1$, $S_2$, and $S_3$ and the required intermodulation product $S_1 S_2 S_3$ are generated individually by a waveform generator and respectively supplied as binary signals to four separate binary phase shift key (BPSK) modulators. In particular, in accordance with equation (2), a first BPSK modulator modulates the quadrature component of the carrier $\sin(\omega t)$ with the binary signal $S_1$, a second BPSK modulator modulates the in-phase component of the carrier $\cos(\omega t)$ with the binary signal $S_2$, a third BPSK modulator modulates the in-phase component of the carrier $\cos(\omega t)$ with the binary signal $S_3$, and a fourth BPSK modulator modulates the quadrature component of the carrier $\sin(\omega t)$ with the intermodulation product $S_1 S_2 S_3$. The outputs of the four modulators are then respectively supplied to four variable attenuators which respectively attenuate the four modulated signals by the four values $\cos(\beta_1)\cos(\beta_2)$, $S_2 \sin(\beta_1)\cos(\beta_2)$, $\cos(\beta_1)\sin(\beta_2)$ and $\sin(\beta_1)\sin(\beta_2)$. The constant-envelope composite signal is then formed by combining the four attenuated, modulated carrier components.

An important aspect of the present invention is the recognition that a constant-envelope composite signal can be generated using only half the number of modulators and attenuators used in the aforementioned interplex modulation approach. Referring again to FIG. 2, signal generator 26 also includes a control signal generator 28 which generates, at the chip rate, four binary control signals $P_I$, $P_Q$, $G_I$ and $G_Q$ based on the values of $\beta_1$ and $\beta_2$ and digital bit streams $S_1$, $S_2$, and $S_3$ (step 52 in FIG. 4). In the exemplary embodiment, the control signal generator 28 is programmed to map the digital bit streams $S_1$, $S_2$ and $S_3$ into four control signals that effectively implement an interplex modulation scheme, as described below in detail. However, as will understood from the following description, the control signal generator 28 can be programmed to implement any of a variety of mappings from the input bit streams to control of the phase and amplitude of a composite transmission signal. Using only the four binary control signals, carrier modulator 30 can control the modulation of an RF signal by employing only two BPSK modulators and two variable attenuators. To understand how this improvement is achieved, first consider that equation (2) can be rewritten as:

$$v(t)=\{S_1 \cos(\beta_1)\cos(\beta_2)-S_1 S_2 S_3 \sin(\beta_1)\sin(\beta_2)\} \sin(\omega t)+ \{S_2 \sin(\beta_1)\cos(\beta_2)+S_3 \cos(\beta_1)\sin(\beta_2)\} \cos(\omega t) \quad (3)$$

Given that signals $S_1$, $S_2$, and $S_3$ can assume only the analog values of +1 and −1, during time intervals in which the gain values $\beta_1$ and $\beta_2$ are constant, it can be seen from equation (3), that the modulated quadrature carrier component $\sin(\omega t)$ can take on only two different amplitudes and two different signs, for a total of four different values. Specifically, if for simplicity, the expression $\cos(\beta_1)\cos(\beta_2)$ is represented by the constant C and the expression $\sin(\beta_1)\sin(\beta_2)$ is represented by the constant D, then the modulation of the quadrature component must have one of four values: C+D, C−D, −C+D, and −C−D, depending upon the instantaneous values of the information signals $S_1$, $S_2$, and $S_3$.

Likewise, the modulated in-phase carrier component $\cos(\omega t)$ also can assume only two different amplitudes and two different signs, for a total of four different values. If the expression $\sin(\beta_1)\cos(\beta_2)$ is represented by the constant E and the expression $\cos(\beta_1)\sin(\beta_2)$ is represented by the constant F, then the modulation of the in-phase component must have one of the four values: E+F, E−F, −E+F, and −E−F, depending upon the instantaneous values of the signals $S_2$ and $S_3$.

To isolate the analog amplitudes and signs of the modulation terms, equation (3) can be expressed as:

$$v(t)=\cos [(\pi/2)(P_Q-1)]\{|S_1 \cos(\beta_1)\cos(\beta_2)-S_1 S_2 S_3 \sin(\beta_1)\sin(\beta_2)|\} \sin(\omega t)+\cos [(\pi/2)(P_I-1)]\{|S_2 \sin(\beta_1)\cos(\beta_2)+S_3 \cos(\beta_1)\sin(\beta_2)|\} \cos(\omega t) \quad (4)$$

Noting that $\beta_1+\beta_2 \leq \pi/2$ when $\cos(\beta_1)\cos(\beta_2) \geq \sin(\beta_1)\sin(\beta_2)$, it follows that:

$P_Q=S_1$, when $\beta_1+\beta_2 \leq \pi/2$, and $P_Q=-S_1 S_2 S_3$, when $\beta_1+\beta_2 > \pi/2$ \quad (5)

Likewise, $\beta_1 \geq \beta_2$ when $\sin(\beta_1)\cos(\beta_2) \geq \cos(\beta_1)\sin(\beta_2)$, and $P_I=S_2$, when $\beta_1 \geq \beta_2$, and $P_I=S_3$, when $\beta_1 < \beta_2$ \quad (6)

Equation (4) can then be rewritten as:

$$v(t)=\phi(Q)A(Q)\sin(\omega t)+\phi(I)A(I)\cos(\omega t) \quad (7)$$

where, $$\phi(Q)=\cos [(\pi/2)(P_Q-1)] \quad (8)$$

$$A(Q)=|S_1 \cos(\beta_1)\cos(\beta_2)-S_1 S_2 S_3 \sin(\beta_1)\sin(\beta_2)| \quad (9)$$

$$\phi(I)=\cos [(\pi/2)(P_I-1)] \quad (10)$$

$$A(I)=|S_2 \sin(\beta_1)\cos(\beta_2)+S_3 \cos(\beta_1)\sin(\beta_2)| \quad (11)$$

Observe that, in equation (4), the terms $\cos [(\pi/2)(P_Q-1)]$ and $\cos [(\pi/2)(P_I-1)]$ (i.e., $\phi(Q)$ and $\phi(I)$) are each equal to either +1 or −1, fluctuating at the chip rate in accordance with the specific values of signals $S_1$, $S_2$ and $S_3$ and the gain factors $\beta_1$ and $\beta_2$. By means of the trigonometric identity $-\cos(\phi)=\cos(\phi-\pi)$, fluctuation of these terms between +1 and −1 can be implemented via a binary phase shift keyed (BPSK) modulator switching between 0 and −180 degrees. Equations (5) and (6) represent the mappings (in analog terms as opposed to logical terms) carried out by control signal generator 28 to generate phase control signals $P_I$ and $P_Q$ from bits streams $S_1$, $S_2$ and $S_3$ on a chip-by-chip basis.

Further observe that the absolute value terms A(Q) and A(I) represent positive-valued attenuation terms that can change value at the chip rate of signal codes $S_1$, $S_2$, and $S_3$.

Because the absolute-value terms always have positive values, these terms can be realized via rapidly switching attenuators that are switchable between two attenuation states at the chip rates of $S_1$, $S_2$ and $S_3$. In particular, when a gain control signal $G_Q$ equivalent to the logical value of $S_2 \oplus S_3$ is a logical zero (analog value of +1), the two addend terms in equation (9) have opposite signs, and A(Q) takes on the smaller of two possible Q-channel attenuation values. When $G_Q = S_2 \oplus S_3$ is a logical one (analog value of −1), the two addend terms in equation (9) have the same sign, and A(Q) takes on the larger of the two possible Q-channel attenuation values. Similarly, when a gain control signal $G_I$ (also equivalent to the logical value of $S_2 \oplus S_3$) is a logical zero, the two addend terms in equation (11) have the same sign, and A(I) takes on the larger of two possible I-channel attenuation values. When $G_I$ is a logical one, the two addend terms in equation (11) have opposite signs, and A(I) takes on the smaller of the two possible I-channel attenuation values (as seen from equations (9) and (11), the two possible Q-channel attenuations are usually different from the two possible I-channel attenuations during a given fixed-gain time interval in which values of $\beta_1$ and $\beta_2$ are held constant). These relationships define the mappings carried out by control signal generator 28 to generate gain control signals $G_I$ and $G_Q$ from bits streams $S_1$, $S_2$ and $S_3$ on a chip-by-chip basis.

Based on insights gained from the foregoing analysis, a programmable waveform generator capable of performing interplex modulation and other various kinds of amplitude and phase modulation can be constructed using no more than half of the expensive components found in previous such devices, making the device lighter in weight, smaller in size, more power efficient, more reliable, significantly less expensive to manufacture, and easier to adjust during manufacture and in the field.

Referring to FIG. 3, carrier modulator 30 receives an RF carrier input signal, Cos(ωt), which is split by a splitter 32 or comparable device into two separate signals. One of the Cos(ωt) signals is phase shifted 90° relative to the input signal via a phase shifter 34 or comparable device to produce a signal Sin(ωt). The signal Sin(ωt) serves as the RF component signal for the quadrature channel of the waveform generator 30, while the unshifted Cos(ωt) signal serves as the RF component signal for the in-phase channel.

In the quadrature channel, the RF carrier component Sin(ωt) is supplied to a BPSK modulator 36 which modulates the RF carrier component by applying a phase of either 0° or −180° to the Sin(ωt) signal in accordance with the value of the input control signal $P_Q$ (step 54). The value of $P_Q$ can vary at the chip rate in accordance with the values of signal codes $S_1$, $S_2$, and $S_3$ and the gain factors $\beta_1$ and $\beta_2$. Input signals $S_1$, $S_2$ and $S_3$ are digital bitstreams of logical ones and zeros. These input signals can also be in "analog" representation, meaning the signals assume the values of −1 and +1, corresponding to the logic values 1 and 0, respectively. In the case of $P_Q$, as indicated in equation (5), when the sum of the gain factors is less than or equal π/2 ($\beta_1 + \beta_2 \leq \pi/2$), the control signal generator simply sets the value of $P_Q$ to that of signal $S_1$ such that, in accordance with equation (8), when signal $S_1$ is a logical 0 (analog +1), BPSK modulator 36 shifts the quadrature carrier component Sin((ωt) by zero degrees, and when signal $S_1$ is a logical 1 (analog −1), BPSK modulator 36 shifts the quadrature carrier component Sin(ωt) by −180 degrees.

When the sum of the gain factors is greater than π/2 ($\beta_1 + \beta_2 > \pi/2$), the analog value of $P_Q$ is $-S_1 S_2 S_3$ or, equivalently, the logical value of $P_Q$ is $\overline{S_1 \oplus S_2 \oplus S_3}$ such that, when $\overline{S_1 \oplus S_2 \oplus S_3}$ is a logical 0 ($-S_1 S_2 S_3$=analog+1), BPSK modulator 36 shifts the quadrature carrier component Sin(ωt) by zero degrees, and when $\overline{S_1 \oplus S_2 \oplus S_3}$ is a logical 1 ($-S_1 S_2 S_3$=analog−1), BPSK modulator 36 shifts the quadrature carrier component Sin(ωt) by −180 degrees.

During the same time period that the BPSK modulator 36 has phase shifted the quadrature component of the RF output signal by either 0° or −180°, the phase-shifted Q-component signal is amplitude modulated by a rapidly switchable, variable attenuator 38 (step 56 in FIG. 4). As seen from the foregoing analysis and from equation (9), the attenuation level A(Q) varies between only two values. In particular, A(Q) varies between a maximum gain (minimum attenuation) of:

$$A(Q)_1 = |\cos(\beta_1)\cos(\beta_2) + \sin(\beta_1)\sin(\beta_2)| = \text{MaxGain}_Q \quad (12)$$

and a minimum gain (maximum attenuation) of:

$$A(Q)_0 = |\cos(\beta_1)\cos(\beta_2) - \sin(\beta_1)\sin(\beta_2)| = \text{MinGain}_Q \quad (13)$$

where the 0 and 1 subscripts on the term A(Q) refer to the logical state of the binary gain control signal $G_Q$. The values of MaxGain$_Q$ and MinGain$_Q$ depend solely on the values of gain factors $\beta_1$ and $\beta_2$. Each time the relative power of the signals $S_1$, $S_2$ and $S_3$ are adjusted (by adjusting $\beta_1$ and $\beta_2$), variable attenuator 38 is programmed with corresponding MaxGain$_Q$ and MinGain$_Q$ attenuation levels via N-bit words indicating the two attenuation levels.

The attenuation level applied to the phase-shifted quadrature RF carrier component is selected at the chip rate in accordance with the instantaneous values of signals $S_2$ and $S_3$, requiring a rapidly switching attenuator capable of switching attenuation levels at the chip rate. Specifically, when the logical exclusive-OR of $S_2$ and $S_3$ ($S_2 \oplus S_3 = G_Q$) is a logical zero ($S_2 S_3$=analog+1), the attenuation MinGain$_Q$ (A(Q)$_0$) is applied to the Sin(ωt) carrier component, and when the exclusive-OR of $S_2$ and $S_3$ is a logical one ($S_2 S_3$=analog−1), the attenuation MaxGain$_Q$ (A(Q)$_1$) is applied to the Sin(ωt) carrier component. Again, control signal generator 28 determines the value of $G_Q$ on a chip-by-chip basis in accordance with the exclusive-OR value of $S_2$ and $S_3$ (step 52).

A similar scheme is employed with the in-phase channel of programmable waveform generator 30. In particular, the RF carrier component Cos(ωt) is supplied to a binary phase shift keyed (BPSK) modulator 40 which modulates the RF carrier component by applying a phase of either 0° or −180° to the Cos(ωt) component signal in accordance with the value of the input signal $P_I$ (step 54). The value of $P_I$ is simply that of signal $S_2$ or that of signal $S_3$, depending upon the values of gain factors $\beta_1$ and $\beta_2$. As indicated in equation (6), when gain factor $\beta_1$ is greater than or equal to gain factor $\beta_2$, control signal generator 28 sets the value of $P_I$ to that of signal $S_2$ such that, in accordance with equation (10), when signal $S_2$ is a logical 0 (analog+1), BPSK modulator 40 shifts the in-phase carrier component Cos(ωt) by zero degrees, and when signal $S_2$ is a logical 1 (analog−1), BPSK modulator 40 shifts the in-phase carrier component Cos(ωt) by −180 degrees.

When gain factor $\beta_1$ is less than gain factor $\beta_2$, control signal generator 28 sets the value of $P_I$ to that of signal $S_3$ such that when signal $S_3$ is a logical 0 (analog+1), BPSK modulator 40 shifts the in-phase carrier component Cos(ωt) by zero degrees, and when signal $S_3$ is a logical 1 (analog−1), BPSK modulator 40 shifts the in-phase carrier component Cos(ωt) by −180 degrees.

Once BPSK modulator 40 has phase shifted the in-phase component of the RF output signal by either 0° or −180°, the phase-shifted signal is amplitude modulated by variable attenuator 42 (step 56). As seen from equation (11), the attenuation level A(I) varies between only two values. In particular, A(I) varies between a maximum gain (minimum attenuation) of:

$$A(I)_0 = |\operatorname{Sin}(\beta_1)\operatorname{Cos}(\beta_2) + \operatorname{Cos}(\beta_1)\operatorname{Sin}(\beta_2)| = \text{MaxGain}_I \quad (14)$$

and a minimum gain (maximum attenuation) of:

$$A(I)_1 = |\operatorname{Sin}(\beta_1)\operatorname{Cos}(\beta_2) - \operatorname{Cos}(\beta_1)\operatorname{Sin}(\beta_2)| = \text{MinGain}_I \quad (15)$$

where the 0 and 1 subscripts on the term A(I) refer to the logical state of the binary gain control signal $G_I$. The values of $\text{MaxGain}_I$ and $\text{MinGain}_I$ depend solely on the values of gain factors $\beta_1$ and $\beta_2$. Each time the relative power of the signals $S_1$, $S_2$ and $S_3$ are adjusted (by adjusting $\beta_1$ and $\beta_2$), variable attenuator 42 is programmed with corresponding $\text{MaxGain}_I$ and $\text{MinGain}_I$ attenuation levels via N-bit words indicating the two attenuation levels.

The attenuation level applied to the phase-shifted in-phase RF carrier component is selected at the chip rate in accordance with the instantaneous values of signals $S_2$ and $S_3$. In accordance with the mapping performed by control signal generator 28, when the logical exclusive-OR of $S_2$ and $S_3$ ($S_2 \oplus S_3 = G_I$) is a logical zero ($S_2 S_3 =$ analog+1), the attenuation $\text{MaxGain}_I$ (A(I)$_0$) is applied to the Cos(ωt) carrier component, and when the exclusive-OR of $S_2$ and $S_3$ is a logical one ($S_2 S_3 =$ analog−1), the attenuation $\text{MinGain}_I$ (A(I)$_1$) is applied to the Cos(ωt) carrier component. The output I and Q component signals from attenuators 42 and 38 are supplied to a signal combiner 44 and combined to form the output RF signal V(t) for transmission (step 58 in FIG. 4).

Table 1 summarizes the BPSK phase shift states and the attenuator gain states for the in-phase and quadrature channels of waveform generator 30.

Table 1 is essentially a mapping of the digital input bitstreams to the attenuators and BPSK modulator control inputs. Table 1 illustrates that it is possible to implement the described modulation technique via the modulator configuration shown in FIG. 3. Specifically, the programmable waveform generator of the present invention implements three-signal interplex modulation with only two phase modulators and two gain modulators (i.e., variable attenuators). Each attenuator switches between two attenuation states (and, hence, two amplitude states) and each BPSK phase shifter switches between two phase values in accordance with the logic of Table 1.

In FIG. 2, the mapping of the digital input bitstreams to the attenuator and BPSK modulator inputs is represented functionally by control signal generator 28. In accordance with Table 1, control signal generator 28 formulates control signals $P_Q$, $P_I$, $G_Q$, and $G_I$ at the chip rate based on the values of $S_1$, $S_2$, $S_3$, $\beta_1$ and $\beta_2$. Of course, the indicated mapping implements the specific interplex modulation scheme described in the exemplary embodiment. It will be understood that other mappings are possible to implement various other schemes, and as such the invention is not limited to this specific mapping of the digital input bitstreams to the variable attenuator and BPSK modulator inputs. To implement a different mapping, control signal generator 28 can be reprogrammed, such that different combinations of the bit streams $S_1$, $S_2$ and $S_3$ dictate the states of the BPSK modulators and the variable attenuators.

Advantageously, in comparison to the interplex modulation technique described in the aforementioned patent application, the programmable waveform generator of the present invention implements interplex modulation while requiring less than one-half the hardware, being lighter in weight, smaller, easier to adjust during manufacture and operation, and costing significantly less. In particular, the number of BPSK modulators, the number of attenuators and the number of separate signal modulation "legs" is reduced from

TABLE 1

| Numeric State | Logic State | Attenuator Gain State | BPSK State |
|---|---|---|---|
| Q Channel | | | |
| $G_Q = S_2 S_3 = +1$ | $G_Q = S_2 \oplus S_3 =$ Logic 0 | $A(Q)_0 = \text{MinGain}_Q$ | |
| $G_Q = S_2 S_3 = -1$ | $G_Q = S_2 \oplus S_3 =$ Logic 1 | $A(Q)_1 = \text{MaxGain}_Q$ | |
| when $\beta_1 + \beta_2 \leq \pi/2$ | | | |
| $P_Q = S_1 = +1$ | $P_Q = S_1 =$ Logic 0 | | 0 Degrees |
| $P_Q = S_1 = -1$ | $P_Q = S_1 =$ Logic 1 | | −180 Degrees |
| when $\beta_1 + \beta_2 > \pi/2$ | | | |
| $P_Q = -S_1 S_2 S_3 = +1$ | $P_Q = \overline{S_1 \oplus S_2 \oplus S_3} =$ Logic 0 | | 0 Degrees |
| $P_Q = -S_1 S_2 S_3 = -1$ | $P_Q = \overline{S_1 \oplus S_2 \oplus S_3} =$ Logic 1 | | −180 Degrees |
| I Channel | | | |
| $G_I = S_2 S_3 = +1$ | $G_I = S_2 \oplus S_3 =$ Logic 0 | $A(I)_0 = \text{MaxGain}_I$ | |
| $G_I = S_2 S_3 = -1$ | $G_I = S_2 \oplus S_3 =$ Logic 1 | $A(I)_1 = \text{MinGain}_I$ | |
| when $\beta_1 \geq \beta_2$ | | | |
| $P_I = S_2 = +1$ | $P_I = S_2 =$ Logic 0 | | 0 Degrees |
| $P_I = S_2 = -1$ | $P_I = S_2 =$ Logic 1 | | −180 Degrees |
| when $\beta_1 < \beta_2$ | | | |
| $P_I = S_3 = +1$ | $P_I = S_3 =$ Logic 0 | | 0 Degrees |
| $P_I = S_3 = -1$ | $P_I = S_3 =$ Logic 1 | | −180 Degrees | four to two, while reducing the alignment time by one half. By varying the attenuation of two rapidly switchable attenuators between two states at the same time the BPSK modulators are varying between 0° and 180° in accordance with a certain coding on the input signal streams, two signal legs, two attenuators, and two BPSK modulators can be eliminated. These improvements are particularly advantageous in applications such as space satellites and cellular telephones.

While the implementation described in the exemplary embodiment employs BPSK modulation to perform phase modulation and variable attenuators to perform amplitude modulation, it will be appreciated that the invention is not limited to this modulation scheme, and the invention can be implemented using any phase shifted keyed modulation, including quadrature phase shift keying, 8-PSK, etc., as well as quadrature amplitude modulation QAM schemes, such as 16-QAM, or any signal state-space constellation. Likewise, the RF carrier components can be modulated with any feasible number of discrete amplitude states via any suitable attenuator or gain devices. In general, the signal modulation technique of the present invention allows instantaneous and simultaneous programmability of amplitude and phase of any modulated carrier point in an amplitude/phase constellation. As used herein the term amplitude/phase "constellation" refers to a set of desired amplitude and phase points of the modulated carrier in signal state space. In the foregoing example, the amplitude/phase constellation is used to implement interplex modulation, such as that used in GPS signal transmission and also having commercial application in CDMA transmission, as used in wireless telephony. Although exemplary embodiment employs invention to implement interplex modulator, invention capable of implementing various kinds of amplitude and phase modulations.

The programmability characteristic of the present invention allows remote programmability of the modulation characteristics of units in the field, such as satellites in orbit, communications infrastructure, and mobile communication devices, including wireless telephones. The capability to reprogram the waveform generator is especially valuable in the space satellite context, where changes in required modulation can take many years and a new satellite design to accomplish. With the reprogrammable waveform generator of the present invention on board, a satellite can be reprogrammed in orbit.

The modulation technique of the present invention has wide application in areas of radio communication and navigation including, but not limited to: systems employing code division multiple access (CDMA) multiplexing; space satellites, such as the those used in the GPS system or other position location systems; and in systems where constant-envelope signals or interplex modulation techniques would be advantageous.

While the invention has been shown in FIG. 2 as involving a signal generator and a carrier modulator performing specific functions, this separation into specific operation units is purely for illustrative purposes. The invention is not limited to any particular segmentation of these functions, and the invention can be realized using any of a variety of hardware and software configuration. For example, the functions of the control signal generator maybe closely coupled (via a particular hardware or software implementation) to the modulators and attenuators of the carrier modulator, with the generation of the digital bit streams being handled by a separate module or processor. Likewise, a control signal generator/carrier modulator can be coupled with a separate or external signal generating device (which may or may not be programmable), in order to implement a system with fewer modulator components than would otherwise be possible.

Having described preferred embodiments of a new and improved method and apparatus for generating a composite signal, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of combining a plurality of digital signals to form a composite signal for transmission, wherein individual ones of the digitals signals comprise a stream of signal values, comprising:
   (a) modulating the phase and amplitude of a first component of a carrier signal by controlling both a state of a first phase modulator and a state of a first variable attenuator in accordance with values of the digital signals being combined in the composite signal, such that an attenuation level of the first variable attenuator is selected as function of a combination of the values of the digital signals;
   (b) modulating the phase and amplitude of a second component of the carrier signal by controlling both a state of a second phase modulator and a state of a second variable attenuator in accordance with values of the digital signals being combined in the composite signal, such that an attenuation level of the second variable attenuator is selected as function of a combination of the values of the digital signals; and
   (c) combining the first and second components of the carrier signal to form the composite signal.

2. The method of claim 1, wherein the composite signal is a constant-envelope signal.

3. The method of claim 2, wherein the composite signal is formed from the digital signals via interplex modulation.

4. The method of claim 1, wherein the digital signals are baseband signals.

5. The method of claim 1, wherein the digital signals are spread spectrum signals, and wherein the states of the first and second phase modulators and the first and second variable attenuators are controlled at the chip rate of the spread spectrum signals.

6. The method of claim 1, wherein the digital signals contain global positioning information.

7. The method of claim 1, wherein the digital signals are code division multiple access signals.

8. The method of claim 1, wherein the first and second components of the carrier signal are in-phase and quadrature components of an RF carrier signal.

9. The method of claim 1, wherein the first and second components of the carrier signal are modulated via phase shift keying.

10. The method claim 9, wherein the phase shift keying includes at least one of binary phase shift keying and quadrature phase shift keying.

11. The method of claim 1, wherein the plurality of digital signals includes three digital signals.

12. The method of claim 1, wherein:
   the state of the first variable attenuator is dynamically set to one of a plurality of first attenuation levels in accordance with values of the digital signals;

the state of the second variable attenuator is dynamically set to one of a plurality of second attenuation levels in accordance with values of the digital signals; and the first and second attenuation levels effect a relative power distribution among the digital signals within the composite signal.

13. The method of claim 1, further comprising:

(d) generating first and second phase control signals and first and second gain control signals based on values of the digital signals, wherein the first and second phase control signals respectively control the states of the first and second phase modulators, and the first and second gain control signals respectively control the states of the first and second variable attenuators.

14. The method of claim 1, wherein control of the first and second phase modulators and the first and second variable attenuators is programmable.

15. The method of claim 1, wherein the control of the first and second phase modulators and the first and second variable attenuators is remotely reprogrammable.

16. An apparatus for combining a plurality of digital signals to form a composite signal for transmission, wherein individual ones of the digitals signals comprise a stream of signal values, comprising:

a first phase modulator configured to modulate the phase of a first component of a carrier signal in accordance with values of the digital signals;

a first variable attenuator configured to attenuate the amplitude of the first component of the carrier signal in accordance with values of the digital signals being combined in the composite signal, such that an attenuation level of the first variable attenuator is selected as function of a combination of the values of the digital signals;

a second phase modulator configured to modulate the phase of a second component of the carrier signal in accordance with values of the digital signals;

a second variable attenuator configured to attenuate the amplitude of the second component of the carrier signal in accordance with values of the digital signals being combined in the composite signal, such that an attenuation level of the second variable attenuator is selected as function of a combination of the values of the digital signals; and a signal combiner configured to combine the first and second components of the carrier signal to form the composite signal.

17. The apparatus of claim 16, wherein the composite signal formed by said apparatus is a constant-envelope signal.

18. The apparatus of claim 17, wherein said apparatus is configured to operate as an interplex modulator that forms the constant-envelope signal.

19. The apparatus of claim 16, wherein the digital signals are spread spectrum signals, and wherein states of the first and second phase modulators and the first and second variable attenuators are controlled at the chip rate of the spread spectrum signals.

20. The apparatus of claim 16, wherein the first and second components of the carrier signal are in-phase and quadrature components of an RF carrier signal.

21. The apparatus of claim 16, wherein said first and second phase modulators are phase shift keyed modulators which respectively modulate the phases of the first and second components of the carrier signal via phase shift keying.

22. The apparatus of claim 21, wherein said first and second phase modulators employ at least one of binary phase shift keying and quadrature phase shift keying.

23. The apparatus of claim 16, wherein said apparatus combines three digital signals into the composite signal.

24. The apparatus of claim 16, wherein:

a state of said first variable attenuator is dynamically set to one of a plurality of first attenuation levels in accordance with values of the digital signals;

a state of said second variable attenuator is dynamically set to one of a plurality of second attenuation levels in accordance with values of the digital signals; and the first and second attenuation levels effect a relative power distribution among the digital signals within the composite signal.

25. The apparatus of claim 24, wherein said first and second variable attenuators adjust the first and second attenuation levels in accordance with adjustments in the relative power distribution among the digital signals.

26. The apparatus of claim 16, further comprising a signal generator configured to generate the digital signals in response to corresponding input signals.

27. The apparatus of claim 26, wherein the digital signals are baseband signals.

28. The apparatus of claim 26, wherein the digital signals are spread spectrum signals, and wherein states the first and second modulators and the first and second variable attenuators are controlled at the chip rate of the spread spectrum signals.

29. The apparatus of claim 26, wherein said signal generator generates first and second phase control signals and first and second gain control signals based on values of the digital signals, wherein the first and second phase control signals respectively control states of the first and second phase modulators, and the first and second gain control signals respectively control states of the first and second variable attenuators.

30. The apparatus of claim 26, wherein said signal generator is programmable to facilitate modification of signaling parameters.

31. The apparatus of claim 26, wherein said signal generator is programmable to modify a mapping between the digital signals and the first and second phase control signals and the first and second gain control signals.

32. The apparatus of claim 26, wherein said signal generator is remotely reprogrammable.

33. The apparatus of claim 16, wherein the digital signals contain global positioning information.

34. The apparatus of claim 16, wherein the digital signals are code division multiple access signals.

35. An apparatus for combining a plurality of digital signals to form a composite signal for transmission, wherein individual ones of the digitals signals comprise a stream of signal values, comprising:

first means for modulating the phase of a first component of a carrier signal in accordance with values of the digital signals;

first means for attenuating the amplitude of the first component of the carrier signal in accordance with values of the digital signals being combined in the composite signal, such that an attenuation level of the first means for attenuating is selected as function of a combination of the values of the digital signals;

second means for modulating the phase of a second component of the carrier signal in accordance with values of the digital signals;

second means for attenuating the amplitude of the second component of the carrier signal in accordance with values of the digital signals being combined in the composite signal, such that an attenuation level of the second means for attenuating is selected as function of a combination of the values of the digital signals;

means for combining the first and second components of the carrier signal to form the composite signal.

36. The apparatus of claim 35, wherein the composite signal formed by said apparatus is a constant-envelope signal.

37. The apparatus of claim 35, wherein said apparatus is configured to operate as an interplex modulator that forms the constant-envelope signal.

38. The apparatus of claim 35, wherein the digital signals are spread spectrum signals, and wherein states of the first and second means for modulating and of the first and second means for attenuating are controlled at the chip rate of the spread spectrum signals.

39. The apparatus of claim 35, wherein the first and second components of the carrier signal are in-phase and quadrature components of an RF carrier signal.

40. The apparatus of claim 35, wherein said first and second means for modulating are phase shift keyed modulators which respectively modulate the phases of the first and second components of the carrier signal via phase shift keying.

41. The apparatus of claim 35, wherein said first and second means for modulating employ at least one of binary phase shift keying and quadrature phase shift keying.

42. The apparatus of claim 35, wherein said apparatus combines three digital signals into the composite signal.

43. The apparatus of claim 35, wherein:
a state of said first means for attenuating is dynamically set to one of a plurality of first attenuation levels in accordance with values of the digital signals;
a state of said second means for attenuating is dynamically set to one of a plurality of second attenuation levels in accordance with values of the digital signals; and
the first and second attenuation levels effect a relative power distribution among the digital signals within the composite signal.

44. The apparatus of claim 43, wherein said first and second means for attenuating adjust the first and second attenuation levels in accordance with adjustments in the relative power distribution among the digital signals.

45. The apparatus of claim 35, further comprising means for generating the digital signals in response to corresponding input signals.

46. The apparatus of claim 45, wherein the digital signals are baseband signals.

47. The apparatus of claim 45, wherein the digital signals are spread spectrum signals, and wherein states the first and second means for modulating and the first and second means for attenuating are controlled at the chip rate of the spread spectrum signals.

48. The apparatus of claim 45, wherein said signal generator generates first and second phase control signals and first and second gain control signals based on values of the digital signals, wherein the first and second phase control signals respectively control states of the first and second means for modulating, and the first and second gain control signals respectively control states of the first and second means for attenuating.

49. The apparatus of claim 45, wherein said signal generator is programmable to facilitate modification of signaling parameters.

50. The apparatus of claim 45, wherein said signal generator is programmable to modify a mapping between the digital signals and the first and second phase control signals and the first and second gain control signals.

51. The apparatus of claim 45, wherein said signal generator is remotely reprogrammable.

52. The apparatus of claim 35, wherein the digital signals contain global positioning information.

53. The apparatus of claim 35, wherein the digital signals are code division multiple access signals.

54. A programmable waveform generator for generating a composite transmission signal from a plurality of digital signals, comprising:
a signal generator configured to generate the plurality of digital signals, wherein individual ones of the digitals signals comprise a stream of signal values; and
a carrier modulator configured to modulate in-phase and quadrature components of a carrier signal, said carrier modulator including: an in-phase phase modulator for modulating the phase of the in-phase component of the carrier signal and an in-phase variable attenuator for attenuating the amplitude of the in-phase component of the carrier signal in accordance with values of the digital signals being combined in the composite signal, such that an attenuation level of the in-phase variable attenuator is selected as function of a combination of the values of the digital signals; a quadrature phase modulator for modulating the phase of the quadrature component of the carrier signal; and a quadrature variable attenuator for attenuating the amplitude of the quadrature component of the carrier signal in accordance with values of the digital signals being combined in the composite signal, such that an attenuation level of the quadrature variable attenuator is selected as function of a combination of the values of the digital signals, said carrier modulator combining the in-phase and quadrature components of the carrier signal to form the composite transmission signal.

55. The programmable waveform generator of claim 54, wherein said signal generator comprises:
a digital bit stream generator configured to generate a plurality of digital bit streams from corresponding input data signals; and
a control signal generator configured to generate phase and gain control signals from the digital bit streams, for controlling states of the in-phase and quadrature phase modulators and variable attenuators.

56. The programmable waveform generator of claim 55, wherein said digital bit stream generator is programmable to facilitate modification of signaling parameters.

57. The programmable waveform generator of claim 55, wherein said control signal generator is programmable to facilitate modification of a mapping between the digital bit streams and the phase and gain control signals.

58. The programmable waveform generator of claim 55, wherein the digital signals are spread spectrum signals, and wherein the phase and gain control signals control the states of the in-phase and quadrature phase modulators and variable attenuators at the chip rate of the spread spectrum signals.

59. The programmable waveform generator of claim 54, wherein the in-phase and quadrature phase modulators are phase shift keyed modulators which respectively modulate the first and second components of the carrier signal via phase shift keying.

60. The programmable waveform generator of claim 54, wherein said signal generator is remotely reprogrammable.

61. The programmable waveform generator of claim 54, wherein the digital signals contain global positioning information.

62. The programmable waveform generator of claim 54, wherein the digital signals are code division multiple access signals.

63. The programmable waveform generator of claim 54, wherein the composite transmission signal formed by said programmable waveform generator is a constant-envelope signal.

64. The programmable waveform generator of claim 54, wherein said programmable waveform generator is configured to operate as an interplex modulator.

* * * * *